Patented Nov. 21, 1944

2,363,108

UNITED STATES PATENT OFFICE 2,363,108

LAXATIVES

Jasper H. Kane, Garden City, and William H. Staebner, Jackson Heights, N. Y., assignors to Charles Pfizer & Company, Brooklyn, N. Y., a corporation of New Jersey No Drawing. Application October 16, 1941,
Serial No. 415,206

1 Claim. (Cl. 167—56)

This invention relates to laxative salts and compositions containing them and has for its object the preparation of cathartics of high efficiency, regularity of action, minimum toxicity and agreeable flavor.

It seems to be the consensus of medical opinion that most of the commonly used saline laxatives depend for their effectiveness upon anions which are slowly absorbed, or upon the specific action of the magnesium cation. There is disagreement as to whether any advantage results from the combination of magnesia with a slowly absorbed anion such as the sulfate radical. (See, for example, Cushny's "Pharmacology and Therapeutics," 12th edition revised, Lea and Febiger, Philadelphia, 1940, pages 275–6, versus Goodman and Gilman, "The Pharmacological Basis of Therapeutics," MacMillan, New York, 1941, page 805.) Apparently, however, there is no doubt that such combinations have effective laxative action, and compositions such as magnesium sulfate are official in the U. S. Pharmacopeia XI. Nevertheless, magnesium sulfate, although a pharmacopeia product, apparently does not meet all requirements. This may be due to undesirable side reactions such as dehydration or partial narcosis resulting from a certain degree of absorption of the magnesium ion, but a more obvious and perhaps a more effective reason is the bitter and unpleasant flavor of magnesium sulfate. The U. S. Dispensatory, 22nd edition, says of magnesium sulfate (page 660): "As a habitual laxative, although widely used, it is generally inferior to the vegetable cathartics."

The U. S. Pharmacopeia XI also describes solution of magnesium citrate. This is agreeable in flavor and is held in high esteem; but it is not generally used for the same purposes as Seidlitz powders and other saline laxatives. Possibly this results from the necessarily greater bulk of the bottled solution, or from the fact that it does not keep well after the bottle is opened. Apparently it has proved more suitable as a reliable purgative for occasional use than for daily mild cathartic action.

Seidlitz powders and other compositions depending for their activity upon the laxative properties of the tartrate radical have long been known and are widely used. Some objection to the ingestion of tartrate has been based upon the showing of Underhill and others (Journal of Pharmacology and Experimental Therapeutics 43:351–8) that the tartrate radical cannot be metabolized in the human body. This conclusion is perhaps hardly applicable to laxatives since they are absorbed only to a very limited degree. In fact, their effectiveness apparently is due to their resistance to absorption. At present the limiting factor in the use of such compositions seems rather to result from the foreign origin of most of our tartrates. In time of war or other stress affecting ocean transportation the supply is inadequate and the price subject to violent fluctuations.

We have now found that fumaric acid, which can be prepared in practically unlimited quantities from domestically available raw materials, has as strong a laxative effect as tartaric acid and is in some respects superior to the older material. Such laxative activity could not have been expected, since fumarates are believed to be easily oxidized in the organism and in fact appear to be normal metabolites. The mechanism of their laxative action is not known. Fumaric acid is only slightly soluble in water, and so should be slowly absorbed. Perhaps when administered in the form of its soluble alkali salts, it is precipitated within the digestive tract by the acid reaction of the stomach and is then substantially incapable of absorption. However, our invention obviously is not dependent upon any theoretical explanation of the mode of action of the fumarates.

Because of its very limited water solubility fumaric acid would appear unsuited to the manufacture of effervescent preparations, but we have found that when mixed with a suitable quantity of an alkali bicarbonate and dropped into water, it gives a prompt and satisfactory evolution of carbon dioxide. It is therefore well suited to the preparation of laxative mixtures whether effervescent or otherwise. Experience shows that the dry bulk and weight of preparations containing fumarates as active ingredients is in general somewhat less than that of similar preparations depending upon the laxative action of tartrates.

Furthermore, our experience indicates that magnesium and calcium fumarates are somewhat more active than an equal weight of disodium fumarate. Calcium fumarate is not very soluble in water. As ordinarily prepared, it is a crystalline salt which, when present in aqueous fluids, quickly settles to the bottom of the container, but we have found that by suitable treatment, such as passage through a colloid mill, it may be prepared in a fluffy, finely divided condition which suspends readily. If desired, the finely ground material may be further treated with a small quantity of an emulsifying oil and passed through a homogenizer. The laxative efficiency of a suspension of calcium fumarate is of about the same order as that of a solution of magnesium fumarate containing the same weight of the dry salt.

Fumaric acid and its salts are stable in storage, generally pleasant in flavor; efficient and reliable, yet gentle in laxative action and of extraordinarily low toxicity. Even if through some unusual condition the fumarate should be absorbed by the digestive tract, it would still be harmless since it is oxidized in the body.

In so far as we have been able to determine there is no recognized method of comparing the effectiveness of saline laxatives on a quantitative basis. Apparently no clinical standards for this property have been established, and we do not find in the literature any quantitative comparisons of the laxative efficiencies of various compositions. Obviously a certain indication of the effectiveness of the known preparations may be obtained by comparing the official average doses. Similarly, the results of our tests of fumarates are perhaps best reported by the following formulas, although it should be understood that these are based upon routine tests upon a limited number of subjects and do not represent a consensus of medical opinion.

The formula for a Seidlitz powder is:

| | Grams |
|---|---|
| Rochelle salt | 7.5 |
| Sodium bicarbonate | 2.5 |
| Tartaric acid | 2.17 |
| Total | 12.17 |

*Example 1.*—By comparison, our formula for one dose of a composition depending upon disodium fumarate is:

| | Grams |
|---|---|
| Disodium fumarate | 6.8 |
| Sodium bicarbonate | 2.5 |
| Fumaric acid | 1.7 |
| Total | 11.0 |

*Example 2.*—When magnesium fumarate is taken alone and in the absence of effervescent salts, the recommended dose is about 9.0 grams. If substituted for disodium fumarate in the formula of Example 1, approximately 6.5 grams of magnesium fumarate should be used.

*Example 3.*—A solution of magnesium fumarate similar in properties to the familiar solution of magnesium citrate can be made according to the following formula:

| | | |
|---|---|---|
| Magnesium fumarate | grams | 9 |
| Sugar syrup (U. S. P.) | ml | 34 |
| Oil of lemon | ml | 0.1 |
| Fumaric acid | grams | 1.0 |
| Sodium bicarbonate | do | 1.2 |
| Water to make | ml | 200 |

All of the ingredients are dissolved but the sodium bicarbonate, which is added just before capping the bottles.

*Example 4.*—Calcium fumarate is prepared in a fluffy, readily suspended form; for instance, by colloidal grinding. Since this material has a very mild flavor, it may be taken in dry form, but it is better stirred into cold water to form a mixed solution-suspension containing about 9 grams of the salt. If preferred, 6.5 grams of the finely ground calcium fumarate may be substituted for the 6.8 grams of disodium fumarate in the effervescent composition of Example 1.

What is claimed is:

A dry, stable laxative composition of matter comprising a member selected from the group consisting of the fumarates of the non-toxic alkali and alkaline earth metals and magnesium, fumaric acid and a non-toxic soluble carbonate.

JASPER H. KANE.
WILLIAM H. STAEBNER.